United States Patent
Yu et al.

(10) Patent No.: US 11,658,981 B1
(45) Date of Patent: May 23, 2023

(54) INTERNET ACCESS MANAGEMENT SERVICE SERVER CAPABLE OF PROVIDING INTERNET ACCESS MANAGEMENT SERVICE BASED ON TERMINAL GROUPING AND OPERATING METHOD THEREOF

(71) Applicant: FRANKLIN TECHNOLOGY INC., Seoul (KR)

(72) Inventors: Changsoo Yu, Hwaseong-si (KR); Ok Chae Kim, Seoul (KR)

(73) Assignee: FRANKLIN TECHNOLOGY INC., Seoul (KR)

( * ) Notice: Subject to any disclaimer, the term of this patent is extended or adjusted under 35 U.S.C. 154(b) by 0 days.

(21) Appl. No.: 17/918,119

(22) PCT Filed: May 27, 2022

(86) PCT No.: PCT/KR2022/007527
§ 371 (c)(1),
(2) Date: Oct. 11, 2022

(30) Foreign Application Priority Data

Apr. 29, 2022 (KR) .................. 10-2022-0053425

(51) Int. Cl.
*H04L 9/40* (2022.01)
*H04L 9/00* (2022.01)
*H04L 9/06* (2006.01)

(52) U.S. Cl.
CPC ............ *H04L 63/102* (2013.01); *H04L 9/008* (2013.01); *H04L 9/0643* (2013.01);
(Continued)

(58) Field of Classification Search
CPC ....... H04L 63/20; H04L 63/10; H04L 63/101; H04L 63/1408; H04L 51/212; G06F 2221/2141
See application file for complete search history.

(56) References Cited

U.S. PATENT DOCUMENTS 9,661,023 B1 * 5/2017 Fang ..................... G06F 21/577
11,263,647 B2 * 3/2022 Lee ..................... G06Q 30/0201
(Continued)

FOREIGN PATENT DOCUMENTS

KR 10-0483558 B1 4/2005
KR 10-0684165 B1 2/2007
(Continued)

OTHER PUBLICATIONS

Ogawa et al., "Fair congestion control method for terminal groups with wireless random access in M2M network," 2012 International Symposium on Communications and Information Technologies (ISCIT) Year: 2012 | Conference Paper | Publisher: IEEE.*
(Continued)

*Primary Examiner* — Roderick Tolentino
(74) *Attorney, Agent, or Firm* — Park, Kim & Suh, LLC (57) ABSTRACT

Disclosed are an Internet access management service sever and an operating method thereof. The present invention presents an Internet access management service server capable of providing an Internet access management service based on terminal grouping and an operating method thereof to support a manager to more conveniently and efficiently perform Internet access management for grouped terminals.

11 Claims, 2 Drawing Sheets

(52) U.S. Cl.
CPC ........ *H04L 63/0428* (2013.01); *H04L 63/104* (2013.01); *H04L 63/108* (2013.01); *H04L 63/20* (2013.01)

(56) References Cited

U.S. PATENT DOCUMENTS

| | | | | |
|---|---|---|---|---|
| 2009/0187657 | A1* | 7/2009 | Uemitsu | G06F 21/10 709/225 |
| 2015/0230170 | A1* | 8/2015 | Jeong | H04W 74/06 370/311 |
| 2015/0288699 | A1* | 10/2015 | Zhou | H04L 61/35 726/4 |
| 2016/0373525 | A1* | 12/2016 | Cheng | H04L 67/01 |
| 2018/0206250 | A1* | 7/2018 | Lee | H04L 25/0228 |
| 2021/0090187 | A1* | 3/2021 | Hernblad | G06Q 50/12 |
| 2021/0176801 | A1* | 6/2021 | Yao | H04L 41/0893 |
| 2021/0185039 | A1* | 6/2021 | Huang | H04L 9/0891 |

FOREIGN PATENT DOCUMENTS

| | | |
|---|---|---|
| KR | 10-0780393 B1 | 11/2007 |
| KR | 10-2013-0116458 A | 10/2013 |
| KR | 10-1371057 B1 | 3/2014 |
| KR | 10-1511474 B1 | 4/2015 |
| KR | 10-1874395 B1 | 7/2018 |

OTHER PUBLICATIONS

Prantl et al., "A Survey on Secure Group Communication Schemes With Focus on IoT Communication," IEEE Access Year: 2022 | vol. 10 | Journal Article | Publisher: IEEE.*

* cited by examiner

FIG. 1

INTERNET ACCESS MANAGEMENT SERVICE SERVER CAPABLE OF PROVIDING INTERNET ACCESS MANAGEMENT SERVICE BASED ON TERMINAL GROUPING AND OPERATING METHOD THEREOF

CROSS-REFERENCE TO RELATED APPLICATIONS

This application is the National Stage filing under 35 U.S.C. 371 of International Application No. PCT/KR2022/007527, filed on May 27, 2022, which claims the benefit of Korean Patent Application No. 10-2022-0053425, filed on Apr. 29, 2022, the contents of which are all hereby incorporated by reference herein in their entirety.

TECHNICAL FIELD

The present invention relates to an Internet access management service server capable of providing an Internet access management service based on terminal grouping and an operating method thereof.

BACKGROUND ART

Recently, as individual Internet use time increases, the need for Internet access management services is also increasing.

Here, the Internet access management service refers to a service that prevents a terminal to be managed from accessing the URL address of a site to be blocked from accessing or accessing the Internet during an Internet access blocking time.

Here, in that the Internet access management service prevents a terminal to be managed from accessing the URL address of a site to be blocked from accessing or accessing the Internet during an Internet access blocking time, it is one of very important things for a manager to appropriately set a scheduling rule.

In this regard, after performing terminal grouping by checking identification information on terminals currently connected to the router equipment, setting the schedule rule for the Internet access management of the grouped terminals is requested to a manager terminal, and when information on a specific schedule rule is received from the manager terminal, if a command of requesting setting information on the corresponding schedule rule is transmitted to the router equipment, the manager can more conveniently and efficiently perform the Internet access management for the grouped terminals.

Therefore, it is necessary to study Internet access management service system technology that can provide Internet access management service based on terminal grouping.

DISCLOSURE

Technical Problem

The present invention presents an Internet access management service server capable of providing an Internet access management service based on terminal grouping and an operating method thereof to support a manager to more conveniently and efficiently perform Internet access management for grouped terminals.

Technical Solution

According to an embodiment of the present invention, an Internet access management service server capable of providing an Internet access management service based on terminal grouping includes: a terminal unique identification information request unit requesting, when a transmission request command of terminal list information for performing Internet access management setting of predetermined router equipment is received from a manager terminal, transmission of terminal unique identification information for terminals currently connected to the router equipment; a terminal unique identification information transmission unit transmitting, when terminal unique identification information of a plurality of first terminals is received from the router equipment in response to the transmission request of the terminal unique identification information, the terminal unique identification information of the plurality of first terminals to the manager terminal; a profile information generation unit generating, when a generation request command of a profile for specifying a management group is received while the terminal unique identification information of at least one management target terminal selected among the plurality of first terminals is received from the manager terminal after the terminal unique identification information of the plurality of first terminals is transmitted to the manager terminal, first profile information constituted by the terminal unique identification information of at least one management target terminal; a scheduling rule setting request unit requesting, when the first profile information is generated, setting a scheduling rule for Internet access management to the manager terminal; and a setting request command transmission unit transmitting, when first schedule rule information is (wherein the first schedule rule information is information constituted a uniform resource locator (URL) address of at least one site to be blocked for accessing and Internet access blocking time information) received from the manager terminal, a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information to the router equipment.

Further, according to an embodiment of the present invention, an operating method of an Internet access management service server capable of providing an Internet access management service based on terminal grouping includes: requesting, when a transmission request command of terminal list information for performing Internet access management setting of predetermined router equipment is received from a manager terminal, transmission of terminal unique identification information for terminals currently connected to the router equipment; when terminal unique identification information of a plurality of first terminals is received from the router equipment in response to the transmission request of the terminal unique identification information, transmitting the terminal unique identification information of the plurality of first terminals to the manager terminal; when a generation request command of a profile for specifying a management group is received while the terminal unique identification information of at least one management target terminal selected among the plurality of first terminals is received from the manager terminal after the terminal unique identification information of the plurality of first terminals is transmitted to the manager terminal, generating first profile information constituted by the terminal unique identification information of at least one management target terminal; requesting, when the first profile information is generated, setting a scheduling rule for Internet access management to the manager terminal; and transmitting, when first schedule rule information (the first schedule rule information is information constituted a uniform resource locator (URL) address of at least one site to be blocked for accessing and Internet access blocking time information) is received from the manager terminal, a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information to the router equipment.

Advantageous Effects

The present invention presents an Internet access management service server capable of providing an Internet access management service based on terminal grouping and an operating method thereof to support a manager to more conveniently and efficiently perform Internet access management for grouped terminals.

MODE FOR INVENTION

Hereinafter, embodiments of the present invention will be described in detail with reference to the accompanying drawings. The description does not limit the present invention to specific embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning computer program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

Figure 1:
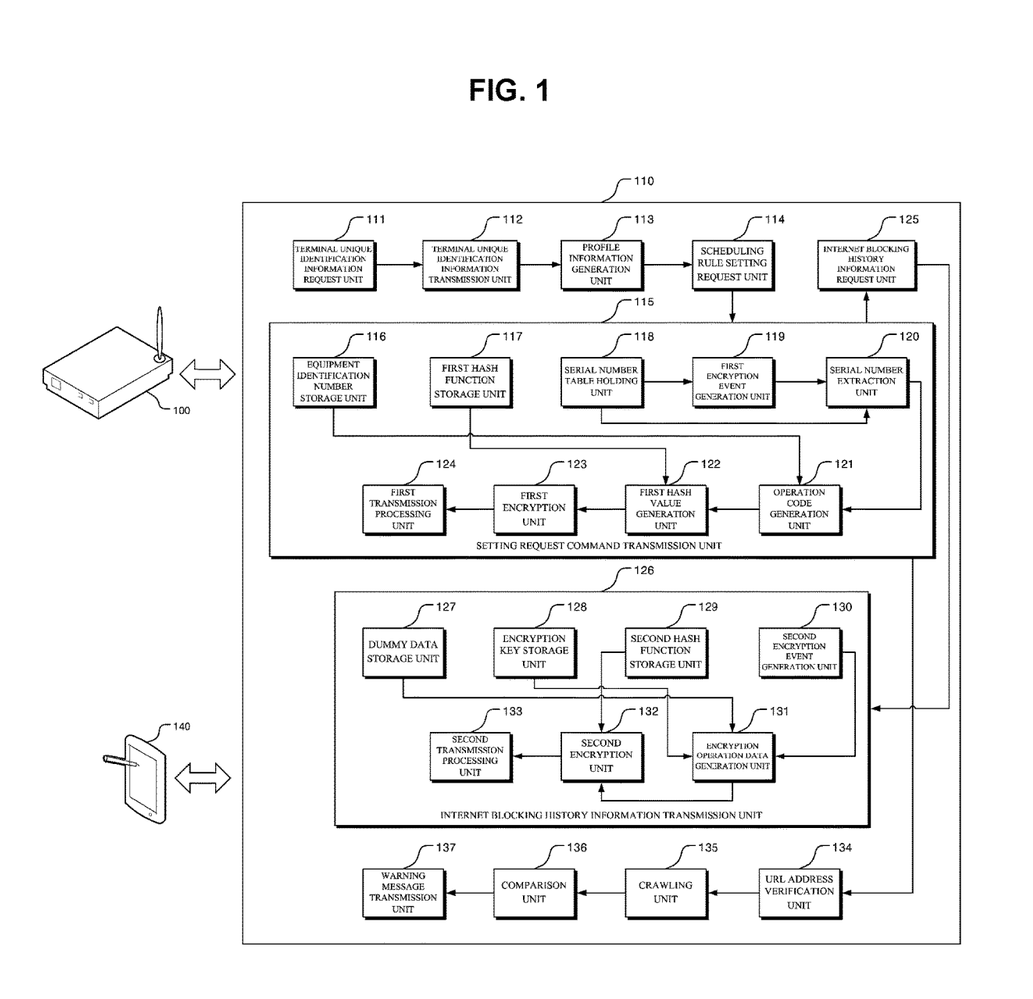
FIG. 1 is a diagram illustrating a structure of an Internet access management service server capable of providing an Internet access management service based on terminal grouping according to an embodiment of the present invention.

FIG. 1 is a diagram illustrating a structure of an Internet access management service server capable of providing an Internet access management service based on terminal grouping according to an embodiment of the present invention.

Referring to FIG. 1, the Internet access management service server 110 according to the present invention includes a terminal unique identification information request unit 111, a terminal unique identification information transmission unit 112, a profile information generation unit 113, a schedule rule setting request unit 114, and a setting request command transmission unit 115.

When the terminal unique identification information request unit 111 receives a transmission request command of terminal list information for performing Internet access management setting of a pre-specified router equipment 100 from a manager terminal 140, the terminal unique identification information request unit 111 requests, to the router equipment 100, transmission of terminal unique identification information for terminals which are currently connected to the router equipment 100.

Here, the terminal unique identification information means a media access control (MAC) address, an Internet protocol (IP) address, an International mobile equipment identity or a telephone number allocated to the terminal if the terminal is a mobile terminal, etc.

When the terminal unique identification information transmission unit 112 receives terminal unique identification information of a plurality of first terminals from the router equipment 100 in response to a transmission request of the terminal unique identification information, the terminal unique identification information transmission unit 112 transmits the terminal unique identification information of the plurality of first terminals to the manager terminal 140.

When the terminal unique identification information of the plurality of first terminals is transmitted to the manager terminal 140, and then a generation request command of a profile for specifying a management group is received while terminal unique identification information of at least one management target terminal selected among the plurality of first terminals is received from a manager terminal 140, the profile information generation unit 113 generates first profile information constituted by the terminal unique identification information of at least one management target terminal.

When the first profile information is generated, the scheduling rule setting request unit 114 requests setting of the scheduling rule for the Internet access management to the manager terminal 140.

When the setting request command transmission unit 115 receives, from the manager terminal 140, first schedule rule information (the first schedule rule information is information on a uniform resource locator (URL) address of at least one site to be blocked for accessing and Internet access blocking time information), the setting request command transmission unit 115 transmits, to the router equipment 100, a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information.

Hereinafter, operations of the terminal unique identification information request unit 111, the terminal unique identification information transmission unit 112, the profile information generation unit 113, the scheduling rule setting request unit 114, and the setting request command transmission unit 115 will be described in detail as an example.

First, it is assumed that the Internet access management service server 110 receives, from the manager terminal 140, the transmission request command of the terminal list information for performing the Internet access management setting of a pre-specified router equipment 100.

Then, the terminal unique identification information request unit 111 may request, to the router equipment 100, transmission of the terminal unique identification information for the terminals which are currently connected to the router equipment 100.

In this case, when it is assumed that MAC addresses such as '1A:00:3F:F1:4C:C5, 40:8D:5C:00:72:B5, 85:D1:EE:2A:00:16, CF:76:11:2D:09:00, EA:05:31:A7:C2:99' are received from the router equipment 100 as terminal unique identification information of 'terminal 1, terminal 2, terminal 3, terminal 4, terminal 5' which are a plurality of first terminals, in response to the transmission request of the terminal unique identification information, the terminal unique identification information transmission unit 112 may transmit, to the manager terminal 140, '1A:00:3F:F1:4C:C5, 40:8D:5C:00:72:B5, 85:D1:EE:2A:00:16, CF:76:11:2D:09:00, EA:05:31:A7:C2:99' which are the terminal unique identification information of 'terminal 1, terminal 2, terminal 3, terminal 4, terminal 5'.

As such, it is assumed that the terminal unique identification information of 'terminal 1, terminal 2, terminal 3, terminal 4, terminal 5' is transmitted to the manager terminal 140 through the terminal unique identification information transmission unit 112, and then 'terminal 1, terminal 3, terminal 5' are selected as at least one management target terminal among 'terminal 1, terminal 2, terminal 3, terminal 4, terminal 5' by the manager.

In such a situation, when the generation request command of the profile for specifying the management group is received while '1A:00:3F:F1:4C:C5, 85:D1:EE:2A:00:16, EA:05:31:A7:C2:99' which are the terminal unique identification information of the selected 'terminal 1, terminal 3, terminal 5' are received from the manager terminal 140 to the Internet access management service server 110, the profile information generation unit 113 may generate 'profile information 1' constituted by '1A:00:3F:F1:4C:C5, 85:D1:EE:2A:00:16, EA:05:31:A7:C2:99' which are the terminal unique identification information of 'terminal 1, terminal 3, terminal 5'.

As such, when 'profile information 1' is generated by the profile information generation unit 113, the scheduling rule setting request unit 114 may request the manager terminal 140 to set the scheduling rule for the Internet access management.

In this case, when it is assumed that 'schedule rule information 1' constituted by 'URL address 1, URL address 2' which are the URL addresses of 'site 1, site 2' to be blocked for accessing and 'everyday, 10 p.m. to 7 a.m.' which are the Internet access blocking time information is received from the manager terminal 140 as the first schedule rule information in response the setting request of the scheduling rule, the setting request command transmission unit 115 may transmit, to the router equipment 100, a scheduling rule setting request command of requesting setting a scheduling rule for preventing 'terminal 1, terminal 3, terminal 5' included in 'profile information 1' from accessing 'URL address 1, URL address 2' which are the URL addresses of 'site 1, site 2' and accessing the Internet during an Internet access blocking time such as 'everyday, 10 p.m. to 7 a.m.', according to 'schedule rule information 1' while transmitting 'profile information 1' and 'schedule rule information 1'.

In this case, when the router equipment 100 receives the scheduling rule setting request command while receiving 'profile information 1' and 'schedule rule information 1' from the Internet access management service server 110, the router equipment 100 may set the scheduling rule for preventing 'terminal 1, terminal 3, terminal 5' included in 'profile information 1' from accessing 'URL address 1, URL address 2' which are the URL addresses of 'site 1, site 2' and accessing the Internet during the Internet access blocking time such as 'everyday, 10 p.m. to 7 a.m.', according to 'schedule rule information 1'.

As such, when 'terminal 1, terminal 3, terminal 5' try to access 'URL address 1, URL address 2' which are the URL addresses of 'site 1, site 2' or try to access the Internet at the Internet access blocking time such as 'everyday, 10 p.m. to 7 a.m.', after the scheduling rule is set by the router equipment 100 through the router equipment 100, the router equipment 100 may perform access blocking control for 'terminal 1, terminal 3, terminal 5'.

According to an embodiment of the present invention, when the setting request command transmission unit 115 transmits the first profile information and the first schedule rule information to the router equipment 100, the setting request command transmission unit 155 may encrypt the first profile information and the first schedule rule information and transmit the encrypted first profile information and first schedule rule information to the router equipment 100 in order to prevent the first profile information and the first schedule rule information from being exposed to other persons.

In this regard, according to an embodiment of the present invention, the setting request command transmission unit 115 as a specific component for encrypting the first profile information and the first schedule rule information and transmitting the encrypted first profile information and first schedule rule information to the router equipment 100 may include an equipment identification number storage unit 116, a first hash function storage unit 117, a serial number table holding unit 118, a first encryption event generation unit 119, a serial number extraction unit 120, an operation code generation unit 121, a first hash value generation unit 122, a first encryption unit 123, and a first transmission processing unit 124.

An equipment identification number (an equipment identification number corresponding to the router equipment 100, pre-stored even in the router equipment 100) of t (t is a natural number of 2 or more) digits, which is pre-issued for the router equipment 100 is stored in the equipment identification number storage unit 116.

For example, when t is '4' and an equipment identification number of 4 digits, which is pre-issued for the router equipment 100 is '1230', '1230' which is the equipment identification number corresponding to the router equipment 100 may be stored in the equipment identification number storage unit 116.

The first hash function storage unit 117 stores a predetermined first hash function pre-shared with the router equipment 100.

The serial number table holding unit 118 stores and holds a serial number table in which serial numbers of different t digits are recorded, which correspond to a plurality of predetermined time zones, respectively, which are pre-shared with the router equipment 100.

For example, as in the above-described example, when t is '4', the serial number table holding unit 118 may store and hold a serial number table shown in Table 1 below.

TABLE 1

| Plurality of time zones | Serial numbers of 4 digits |
| --- | --- |
| Time zone 1 (0 a.m. to 4 a.m.) | 6401 |
| Time zone 2 (4 a.m. to 8 a.m.) | 3286 |
| Time zone 3 (8 a.m. to 12 p.m.) | 1752 |
| Time zone 4 (12 p.m. to 4 p.m.) | 5429 |
| . . . | . . . |

When the first encryption event generation unit 119 receives the first schedule rule information from the manager terminal 140, the first encryption event generation unit 119 generates a first encryption event for encrypting and transmitting the first profile information and the first schedule rule information to the router equipment 100.

When the first encryption event occurs, the serial number extraction unit 120 extracts a first serial number corresponding to a first time zone to which a time point when the first encryption event occurs belongs from the serial number table.

When the first serial number is extracted, the operation code generation unit 121 constitutes a result value when performing a modulo-2 operation for each of t numbers constituting the equipment identification number corresponding to the router equipment 100 by bitstreams to generate a first operation code of t bits and constitutes a result value when performing the modulo-2 operation for each of t numbers constituting the first serial number by the bitstreams to generate a second operation code of t bits.

Here, the modulo-2 operation means an operation that performs a division of dividing a dividend by 2 to calculate a remainder therefor.

The first hash value generation unit 122 performs an XOR operation between the first operation code and the second operation code to generate a t-bit seed code, and then applies the seed code to the first hash function as an input to generate a first hash value.

When the first hash value is generated, the first encryption unit 123 generates a first data set constituted by the first profile information and the first schedule rule information, and then encrypts the first data set with the first hash value to generate a first encryption data set.

When the first encryption data set is generated, the first transmission processing unit 124 transits the first encryption data set to the router equipment 100.

Hereinafter, the operations of the first encryption event generation unit 119, the serial number extraction unit 120, the operation code generation unit 121, the first hash value generation unit 122, the first encryption unit 123, and the first transmissions processing unit 124 will be described in detail as an example.

First, it is assumed that the Internet access management service server 110 receives 'schedule rule information 1' from the manager terminal 140.

Then, the first encryption event generation unit 119 may generate a first encryption event for encrypting and transmitting 'profile information 1' and 'schedule rule information 1' to the router equipment 100.

As such, when the first encryption event generation unit 119 may generate a first encryption event, the serial number extraction unit 120 may check a time point when the first encryption event is generated. When the time point of generating the first encryption event is '3:30 p.m. on Mar. 31, 2022', the serial number extraction unit 120 may extract, from the serial number table shown in Table 1 above, '5429' which is the serial number corresponding to 'time zone 4 (12 p.m. to 4 p.m.)' belong to which '3:30 p.m. on Mar. 31, 2022' as the time point of generating the first encryption event, as a first serial number.

Then, the operation code generation unit 121 constitutes a result value when performing the modulo-2 operation for each of 4 numbers constituting '1230' which is the equipment identification number corresponding to the router equipment 100 by the bitstreams to generate a first operation code of 4 bits like '1010' and constitutes a result value when performing the modulo-2 operation for each of 4 numbers constituting '5429' which is the first serial number by the bitstreams to generate a second operation code of 4 bits like '1001'.

Then, the first hash value generation unit 122 performs the XOR operation between the '1010' which is the first operation code and '1001' which is the second operation code to generate a seed code of 4 bits like '0011'.

Then, the first hash value generation unit 122 applies '0011' which is the seed code to the first hash function as the input to generate a first hash value such as '26d103c620a31345ag57qat327891703'.

As such, when the first hash value generation unit 122 generates the first hash value, the first encryption unit 123 generates 'data set 1' constituted by 'profile information 1' and 'schedule rule information 1', and then encrypts 'data set 1' with '26d103c620a31345ag57qat327891703' which is the first hash value to generate 'encryption data set 1'.

As such, when the first encryption unit 123 generates 'encryption data set 1', the first transmission processing unit 124 may transmit 'encryption data set 1' to the router equipment 100.

In this case, according to an embodiment of the present invention, the router equipment 100 pre-stores the equipment identification number corresponding to the router equipment 100, the first hash function, and the serial number table on a memory, extracts the first serial number corresponding to the first time zone to which a time point of receiving the first encryption data set belongs from the serial number table when receiving the first encryption data set from the Internet access management service server 110, and then constitutes a result value when performing the modulo-2 operation for each of t numbers constituting the equipment identification number corresponding to the router equipment 100 by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the first hash function as the input to generate the first hash value, and then decodes the first encryption data set with the first hash value to restore the first data set.

Hereinafter, the operation of the router equipment 100 will be described in detail as an example.

First, as in the above-described example, it is assumed that t is '4', and '1230' which is the equipment identification number corresponding to the router equipment 100, the first hash function pre-shared with the Internet access management service server 110, and the serial number table shown in Table 1 are pre-stored on the memory of the router equipment 100. Further, as in the above-described example, it is assumed that as the first transmission processing unit 124 transmits 'encryption data set 1' to the router equipment 100, the router equipment 100 receives 'encryption data set 1' from the Internet access management service server 110.

Then, the router equipment 100 may check the time point of receiving 'encryption data set 1'. Here, when the time point of receiving 'encryption data set 1' is '3:31 p.m. on Mar. 31, 2022', the router equipment 100 may extract, from the serial number table shown in Table 1 above, '5429' which is the serial number corresponding to 'time zone 4 (12 p.m. to 4 p.m.)' to which '3:31 p.m. on Mar. 31, 2022' as the time point of receiving 'encryption data set 1' belong, as a first serial number.

Then, the router equipment 100 constitutes a result value when performing the modulo-2 operation for each of 4 numbers constituting '1230' which is the equipment identification number corresponding to the router equipment 100 by the bitstreams to generate a first operation code of 4 bits like '1010' and constitutes a result value when performing the modulo-2 operation for each of 4 numbers constituting '5429' which is the first serial number by the bitstreams to generate a second operation code of 4 bits like '1001'.

Thereafter, the router equipment 100 performs the XOR operation between the '1010' which is the first operation code and '1011' which is the second operation code to generate a seed code of 4 bits like '0011'.

Then, the router equipment 100 applies the '0011' which is the seed code to the first hash function as the input to generate the first hash value such as '26d103c620a31345ag57qat327891703', and then decodes 'encryption data set 1' with '26d103c620a31345ag57qat327891703' which is the first hash value to restore 'data set 1'.

According to an embodiment of the present invention, the Internet access management service server 110 may further include an Internet blocking history information request unit 125 and an Internet blocking history information transmission unit 126.

When the Internet blocking history information request unit 125 receives, from the manager terminal 140, a providing request command of Internet blocking history information for the at least one management target terminal according to the first schedule rule information during a predetermined first period after the scheduling rule setting request command is transmitted to the router equipment 100 through the setting request command transmission unit 115, the Internet blocking history information request unit 125 requests transmission of the Internet blocking history information for the at least one management target terminal according to the first schedule rule information during the first period to the router equipment 100.

When the Internet blocking history information transmission unit 126 receives first Internet blocking history information (the first Internet blocking history information is information constituted by the access blocking history information for the at least one site of the at least one management target terminal and the access blocking history information according to the Internet access blocking time) from the router equipment 100 in response to the transmission request of the Internet blocking history information, the Internet blocking history information transmission unit 126 transmits the first Internet blocking history information to the manager terminal 140.

Hereinafter, the operations of the Internet blocking history information request unit 125 and the Internet blocking history information transmission unit 126 will be described in detail as an example.

First, it is assumed that the predetermined first period is '7 days', and after the scheduling rule setting request command is transmitted to the router equipment 100 through the setting request command transmission unit 115, the Internet access management service server 110 receives the providing request command of the Internet blocking history information for 'terminal 1, terminal 3, terminal 5' according to 'schedule rule information 1' during '7 days' which is the predetermined first period from the manager terminal 140.

Then, the Internet blocking history information request unit 125 may request the router equipment 100 to transmit the Internet blocking history information for 'terminal 1, terminal 3, terminal 5' according to 'schedule rule information 1' during '7 days'.

In this case, when it is assumed that 'Internet blocking history information 1' shown in Table 2 below is received from the router equipment 100 as the first Internet blocking history information in response to the transmission request of the Internet blocking history information, the Internet blocking history information transmission unit 126 may transmit, to the manager terminal 140, 'Internet blocking history information 1' shown in Table 2 below.

TABLE 2

| At least one management target terminal | Access blocking history information for at least one site | | Access blocking history information according to Internet access blocking time |
|---|---|---|---|
| Terminal 1 | Site 1 2 cases | Site 2 1 case | Everyday, 10 p.m. to 7 a.m. 1 case (10:30 p.m. on Apr. 4, 2022) |
| Terminal 3 | Site 1 0 case | Site 2 0 case | Everyday, 10 p.m. to 7 a.m. 0 case |
| Terminal 5 | Site 1 4 cases | Site 2 3 cases | Everyday, 10 p.m. to 7 a.m. 2 cases (11:30 p.m. on Apr. 1, 2022), (2:45 a.m. on Apr. 6, 2022) |

In this case, according to an embodiment of the present invention, when the Internet blocking history information transmission unit 126 transmits the first Internet blocking history information to the manager terminal 140, the Internet blocking history information transmission unit 126 may encrypt the first Internet blocking history information and transmit the encrypted the first Internet blocking history information to the manager terminal 140 in order prevent the first Internet blocking history information from being exposed to the other person.

In this regard, according to an embodiment of the present invention, the Internet blocking history information transmission unit 126 as a specific component for encrypting the first Internet blocking history information and transmitting the encrypted the first Internet blocking history information to the manager terminal 140 may include a dummy data storage unit 127, an encryption key storage unit 128, a second hash function storage unit 129, a second encryption event generation unit 130, an encryption operation data generation unit 131, a second encryption unit 132, and a second transmission processing unit 133.

The dummy data storage unit 127 stores predetermined first dummy data and predetermined second dummy data (the second dummy data is constituted by a 2D code including the second dummy data, and printed on the surface of the router equipment 100 in advance).

For example, when the predetermined first dummy data is '$D_1$' and the predetermined second dummy data is '$D_2$', the dummy data storage unit 127 may store '$D_1$' which is the first dummy data and '$D_2$' which is the second dummy data.

The encryption key storage unit 128 stores a predetermined encryption key (the encryption key is pre-stored even in the manager terminal 140) for homomorphic encryption.

Here, the homomorphic encryption means encryption technology that supports an operation between data to be performed in an encrypted state without decoding encrypted data. In other words, the homomorphic encryption means an encryption technique that makes an encryption value of a computation result of two plaintext-state data be equal to a computation result in the encryption state of two data.

For example, it is assumed that there are plaintext data called A and B, and the encrypted data generated by encrypting A is E(A) and encrypted data generated by encrypting B is E(B). In this case, when it is assumed that a value called E(S) is calculated by encrypting a value acquired by performing a predetermined operation for A and B, making a result of performing a homomorphic operation between E(A) and E(B) be equal to E(S) is a basic concept of the homomorphic encryption. In other words, when a value calculated by performing the predetermined operation for two plaintext data in a plaintext domain is encrypted, encryption that makes the encrypted value be equal to a value acquired by computing two encrypted data in the encryption domain is referred to as homomorphic encryption.

The second hash function storage unit 129 stores a predetermined second hash function pre-shared by the manager terminal 140.

When the second encryption event generation unit 130 receives the first Internet blocking history information from the router equipment 100 in response to the transmission request of the Internet blocking history information, the second encryption event generation unit 130 generates a second encryption event for encrypting and transmitting the first Internet blocking history information to the manager terminal 140.

When the second encryption event is generated, the encryption operation data generation unit 131 calculates operation data by performing an operation between the first dummy data and the second dummy data according to a predetermined first operation equation, and then encrypts the operation data with the encryption key to generate encryption operation data.

The second encryption unit 132 applies the encryption operation data to the second hash function as the input to generate a second hash value, and then encrypts the first Internet blocking history information with the second hash value to generate first encryption Internet blocking history information, and encrypts the first dummy data with the encryption key to generate first encryption dummy data.

When the first encryption Internet blocking history information and the first encryption dummy data are generated, the second transmission processing unit 133 transmits the first encryption Internet blocking history information and the first encryption dummy data to the manager terminal 140.

In this case, the manager terminal 140 pre-stores the encryption key and the second hash function on the memory, displays a scan indication message including contents indicating to scan the 2D code printed on the surface of the router equipment 100 on a screen when the first encryption Internet blocking history information and the first encryption dummy data are received from the Internet access management service server 110, and then encrypts the second dummy data with the encryption key to generate second encryption dummy data when the second dummy data is extracted from the 2D code as the 2D code printed on the surface of the router equipment 100 is scanned and recognized through a camera mounted on the manager terminal 140 by a manager, performs the operation between the first encryption dummy data and the second encryption dummy data according to a predetermined homomorphic operation equation corresponding to the first operation equation to calculate the homomorphic operation data, and then applies the homomorphic operation data to the second hash function as the input to generate the second hash value, and decodes the first encryption Internet blocking history information with the second hash value to restore the first Internet blocking history information.

Here, the homomorphic operation equation as an operation equation for performing the operation between two data for which homomorphic encryption is performed may be predetermined by a developer. The homomorphic operation equation means an operation equation specified to generate a result corresponding to a predetermined operation equation performed between two plaintext data in the plaintext domain in the encryption domain. For example, when there is an operation equation such as a multiplication of multiplying the plaintext data by each other, there may be a homomorphic multiplication corresponding to the multiplication. In this regard, there are plaintext data A and B, and each of A and B is subjected to homomorphic encryption, so encryption data such as E(A) and E(B) are generated, and when the homomorphic operation equation is the homomorphic multiplication corresponding to the multiplication in the plaintext domain, if the homomorphic multiplication is performed for E(A) and E(B) in the encryption domain, an operation result of E(A)⊗E(B) may be generated, and when A and B are multiplied by each other in the plaintext domain, an operation result of 'A×B' may be generated. In this case, a result of encrypting 'A×B' becomes equal to E(A)⊗E(B). When such a relationship is established, the homomorphic multiplication of the homomorphic operation equation may have a relationship to correspond to the multiplication of the plaintext domain. Here, in the homomorphic multiplication, an operation of a form of multiplying two encrypted data is not just performed like the multiplication in the plaintext domain. Since the homomorphic multiplication is the homomorphic operation equation for making the result corresponding to the multiplication in the plaintext domain, the homomorphic multiplication may be defined by a predetermined operation algorithm in which multiplying, adding, dividing, a modulo operation, etc., are complexly performed according to characteristics of the homomorphic encryption instead of an operation process of a form of just multiplying two encrypted data.

Hereinafter, the operations of the second encryption event generation unit 130, the encryption operation data generation unit 131, the second encryption unit 132, the second transmission processing unit 133, and the manager terminal 140 will be described in detail as an example.

First, it is assumed that the predetermined first operation equation is 'multiplication', and 'Internet blocking history information 1' shown in Table 2 above is received from the router equipment 100 as the first Internet blocking history information in response to the transmission request of the Internet blocking history information.

Then, the second encryption event generation unit 130 may generate a second encryption event for encrypting and transmitting 'Internet blocking history information 1' shown in Table 2 to the manager terminal 140.

As such, when the second encryption event generation unit 130 generates the second encryption event, the encryption operation data generation unit 131 performs the operation between '$D_1$' which is the first dummy data and '$D_2$' which is the second dummy data according to the 'multiplication' which is the first operation equation to calculate operation data such as '$D_1 \times D_2$'.

Then, the encryption operation data generation unit 131 encrypts '$D_1 \times D_2$' which is the operation data with the encryption key to generate encryption operation data such as '$E(D_1 \times D_2)$'.

Then, the second encryption unit 132 applies which is the encryption operation data to the second hash function as the input to generate a second hash value such as '51c241d478q2269nm14wrt14211020kz'.

Thereafter, the second encryption unit 132 encrypts 'Internet blocking history information 1' shown in Table 2 above with '51c241d478q2269nm14wrt14211020kz' which is the second hash value to generate 'encryption Internet blocking history information 1' and encrypts '$D_1$' which is the first dummy data with the encryption key to generate first encryption dummy data such as '$E(D_1)$'.

Then, the second transmission processing unit 133 may transmit, to the manager terminal 140, 'encryption Internet blocking history information 1' and '$E(D_1)$' which is the first encryption dummy data.

In this case, it is assumed that the homomorphic operation equation corresponding to the 'multiplication' which is the first operation equation is a homomorphic multiplication expressed as '⊗', the encryption key and the second hash function are pre-stored in the memory of the manager terminal 140, and the 2D code into which the second dummy data '$D_2$' is inserted is pre-printed on the surface of the router equipment 100.

In such a situation, as in the above-described example, it is assumed that the second transmission processing unit 133 transmits, to the manager terminal 140, 'encryption Internet blocking history information 1' and the first encryption dummy data '$E(D_1)$', the manager terminal 140 receives, from the Internet access management service server 110, 'encryption Internet blocking history information 1' and the first encryption dummy data '$E(D_1)$'.

Then, the manager terminal 140 may display a scan indication message including contents indicating to scan the 2D code printed on the surface of the router equipment 100 on the screen.

In this case, it is assumed that the manager which confirms the scan indication message scans and recognizes the 2D code printed on the surface of the router equipment 100 through the camera mounted on the manager terminal 140, the second dummy data '$D_2$' is extracted from the 2D code.

Then, the manager terminal 140 encrypts the second dummy data '$D_2$' with the encryption key to generate the second encryption dummy data such as '$E(D_2)$'.

Then, the manager terminal 140 performs the operation between the first encryption dummy data '$E(D_1)$' and the second encryption dummy data '$E(D_2)$' according to the homomorphic 'multiplication' which is the homomorphic operation equation corresponding to the 'multiplication' which is the first operation equation to calculate the homomorphic operation data such as '$E(D_1) \otimes E(D_2)$'.

In this case, according to the above-described example, since the second hash value '51c241d478q2269nm14wrt14211020kz' is a hash value generated by applying the encryption operation data '$E(D_1 \times D_2)$' to the second hash function as the input, and the homomorphic operation data '$E(D_1) \otimes E(D_2)$' is the same data as the encryption operation data '$E(D_1 \times D_2)$', the manager terminal 140 applies the homomorphic operation data '$E(D_1) \otimes E(D_2)$' to the second hash function as the input to generate the second hash value '51c241d478q2269nm14wrt14211020kz'.

Further, since 'encryption Internet blocking history information 1' is information generated by encrypting 'Internet blocking history information 1' shown in Table 2 with the second hash value '51c241d478q2269nm14wrt14211020kz', the manager terminal 140 decodes 'encryption Internet blocking history information 1' with the second hash value '51c241d478q2269nm14wrt14211020kz' to restore 'Internet blocking history information 1' shown in Table 2 above.

According to an embodiment of the present invention, the Internet access management service server 110 may further include a URL address verification unit 134, a crawling unit 135, a comparison unit 136, and a warning message transmission unit 137.

After the scheduling rule setting request command is transmitted to the router equipment 100 through the setting request command transmission unit 115, the URL address verification unit 134 receives the access history information for the site accessed by the at least one management target terminal from the router equipment 100 at an interval of a predetermined first period and verifies a URL address of a first site which the at least one management target terminal accesses the most during the first period based on the received access history information.

When the URL address of the first site is verified, the crawling unit 135 accesses a web page according to the URL address of the first site, and then crawls a text posted on the accessed web page.

When the text posted on the web page is crawled, the comparison unit 136 counts the number of times that a character string matching a plurality of predetermined harmful words appears in the crawled text, and then compares the countered number of times and a predetermined reference number of times with each other.

When it is determined that the counted number of times exceeds the reference number of times, the warning message transmission unit 137 transmits the URL address of the first site to the manager terminal 140 and transmits a warning message for notifying that the at least one management target terminal is accessing the URL address of a harmful site.

Here, the harmful site means a site containing information that is deemed required for review, such as security risks, gambling, obscenity, illegal drug sales, etc.

Hereinafter, the operations of the URL address verification unit 134, the crawling unit 135, the comparison unit 136, and the warning message transmission unit 137 will be described in detail as an example.

First, it is assumed that the predetermined first period is '6 hours', and the scheduling rule setting request command is transmitted to the router equipment 100 through the setting request command transmission unit 115.

Then, the URL address verification unit 134 may receive access history information on sites accessed by 'terminal 1, terminal 3, terminal 5' from the router equipment 100 at an interval of '6 hours', which is the predetermined first period.

Here, when it is assumed that the received access history information is as shown in Table 3 below, the URL address verification unit 134 may verify 'URL address 3' which is the URL address of 'site 3' which is the first site which 'terminal 1, terminal 3, terminal 5' access the most for '6 hours' based on the access history information shown in Table 3 below.

TABLE 3

| At least one management target terminal | Access history information for accessed site | | |
| --- | --- | --- | --- |
| Terminal 1 | Site 3 | URL address 3 | 04:01 p.m. on Mar. 31, 2022 |
|  | Site 4 | URL address 4 | 04:05 p.m. on Mar. 31, 2022 |
| Terminal 3 | Site 3 | URL address 3 | 05:05 p.m. on Mar. 31, 2022 |
|  | Site 3 | URL address 3 | 05:07 p.m. on Mar. 31, 2022 |
|  | Site 5 | URL address 5 | 06:10 p.m. on Mar. 31, 2022 |
|  | Site 6 | URL address 6 | 06:15 p.m. on Mar. 31, 2022 |
| Terminal 5 | Site 8 | URL address 8 | 04:45 p.m. on Mar. 31, 2022 |
|  | Site 7 | URL address 7 | 04:50 p.m. on Mar. 31, 2022 |
|  | Site 3 | URL address 3 | 07:20 p.m. on Mar. 31, 2022 |

As such, when the URL address verification unit 134 verifies the URL address of the first site, the crawling unit 135 may access the web page according to 'URL address 3' which is the URL address of 'site 3', and then crawl the text posted on the accessed web page.

Then, the comparison unit 136 may count the number of times that character strings matching a plurality of predetermined harmful words in the crawled text appear.

Here, when it is assumed that the plurality of harmful words are 'harmful word 1, harmful word 2, harmful word 3, . . . , harmful word 20', the comparison unit 136 may count the number of times that the character strings matching 'harmful word 1, harmful word 2, harmful word 3, . . . , harmful word 20' appear in the crawled text, and then compare the counted number of times and the predetermined reference number of times.

When the counted number of times is '7' and the reference number of times '5', the warning message transmission unit 137 determines that '7' which is the counted number of times exceeds '5' which is the reference number of times to transmit 'URL address 3' which is the URL address of 'site 3' and transmit a warning message for notifying that 'terminal 1, terminal 3, terminal 5' access the URL address of the harmful site, to the manager terminal 140.

Figure 2:
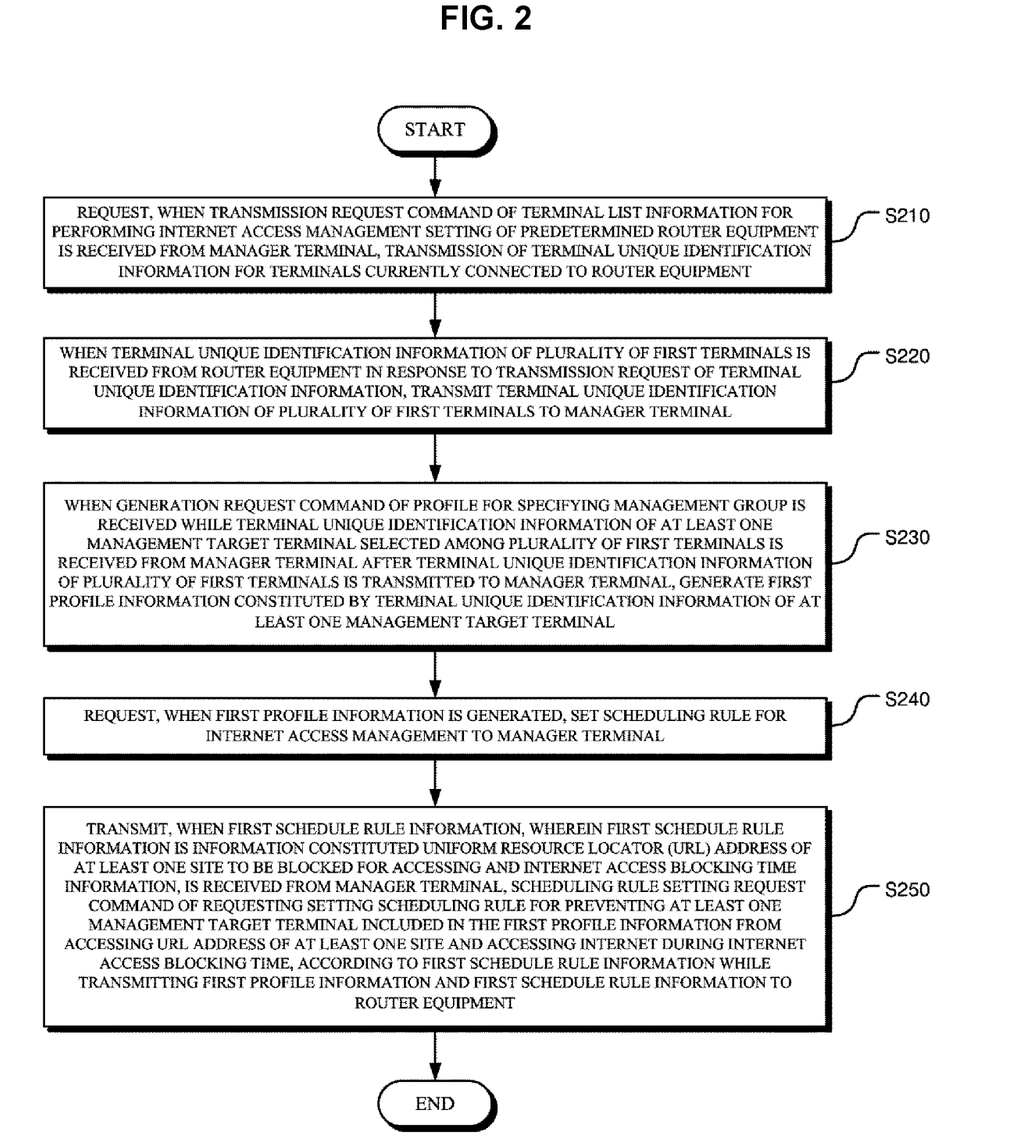
FIG. 2 is a flowchart illustrating an operating method of an Internet access management service server capable of providing an Internet access management service based on terminal grouping according to an embodiment of the present invention.

FIG. 2 is a flowchart illustrating an operating method of an Internet access management service server capable of providing an Internet access management service based on a terminal grouping according to an embodiment of the present invention.

In step S210, when a transmission request command of terminal list information for performing Internet access management setting of predetermined router equipment is received from a manager terminal, transmission of terminal unique identification information for terminals currently connected to the router equipment is requested.

In step S220, when terminal unique identification information of a plurality of first terminals is received from the router equipment in response to the transmission request of the terminal unique identification information, the terminal unique identification information of the plurality of first terminals is transmitted to the manager terminal.

In step S230, when a generation request command of a profile for specifying a management group is received while the terminal unique identification information of at least one management target terminal selected among the plurality of first terminals is received from the manager terminal after the terminal unique identification information of the plurality of first terminals is transmitted to the manager terminal, first profile information constituted by the terminal unique identification information of at least one management target terminal is generated.

In step S240, when the first profile information is generated, setting a scheduling rule for Internet access management is requested to the manager terminal.

In step S250, when first schedule rule information (the first schedule rule information is information constituting a uniform resource locator (URL) address of at least one site to be blocked for accessing and Internet access blocking time information) is received from the manager terminal, transmitting a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information to the router equipment.

In this case, according to an embodiment of the present invention, step S250 may include holding an equipment identification number storage unit storing an equipment identification number (wherein an equipment identification number corresponding to the router equipment is pre-stored even in the router equipment) digits, which is pre-issued for the router equipment of t (t is a natural number of 2 or more), holding a first hash function storage unit storing a predetermined first hash function pre-shared with the router equipment, storing and holding a serial number table in which serial numbers of different t digits are recorded, which correspond to a plurality of predetermined time zones, respectively, which are pre-shared with the router equipment, generating, when receiving the first schedule rule information from the manager terminal, a first encryption event for encrypting and transmitting the first profile information and the first schedule rule information to the router equipment, extracting, when the first encryption event is generated, a first serial number corresponding to a first time zone to which a time point when the first encryption event is generated belongs from the serial number table, constituting, when the first serial number is extracted, a result value when performing a modulo-2 operation for each of t numbers constituting the equipment identification number corresponding to the router equipment by bitstreams to generate a first operation code of t bits and constituting a result value when performing the modulo-2 operation for each of t numbers constituting the first serial number by the bitstreams to generate a second operation code of t bits, performing an XOR operation between the first operation code and the second operation code to generate a t-bit seed code, and then applying the seed code to the first hash function as an input to generate a first hash value, generating, when the first hash value is generated, a first data set constituted by the first profile information and the first schedule rule information, and then encrypting the first data set with the first hash value to generate a first encryption data set, and transmitting, when the first encryption data set is generated, the first encryption data set to the router equipment.

In this case, the router equipment may pre-store the equipment identification number corresponding to the router equipment, the first hash function, and the serial number table on a memory, extract the first serial number corresponding to the first time zone to which a time point of receiving the first encryption data set belongs from the serial number table when receiving the first encryption data set from the Internet access management service server, and then constitute a result value when performing the modulo-2 operation for each of t numbers constituting the equipment identification number corresponding to the router equipment by the bitstreams to generate the first operation code of t bits and constitutes a result value when performing the modulo-2 operation for each of t numbers constituting the first serial number by the bitstreams to generate the second operation code of t bits, and then perform the XOR operation between the first operation code and the second operation code to generate the seed code of t bits, applies the seed code to the first hash function as the input to generate the first hash value, and then decode the first encryption data set with the first hash value to restore the first data set.

Further, according to an embodiment of the present invention, the operating method of an Internet access management service server may further include: when receiving, from the manager terminal, a providing request command of Internet blocking history information for the at least one management target terminal according to the first schedule rule information during a predetermined first period after the scheduling rule setting request command is transmitted to the router equipment, requesting transmission of the Internet blocking history information for the at least one management target terminal according to the first schedule rule information during the first period to the router equipment; and when receiving first Internet blocking history information (wherein the first Internet blocking history information is information constituted by the access blocking history information for the at least one site of the at least one management target terminal and the access blocking history information according to the Internet access blocking time) from the router equipment in response to the transmission request of the Internet blocking history information, transmitting the first Internet blocking history information to the manager terminal.

In this case, according to an embodiment of the present invention, the transmitting of the first Internet blocking history information may include holding a dummy data storage unit storing predetermined first dummy data and predetermined second dummy data, (wherein the second dummy data is constituted by a 2D code including the second dummy data, and printed on the surface of the router equipment in advance), holding an encryption key storage unit storing a predetermined encryption key (wherein the encryption key is pre-stored even in the manager terminal) for homomorphic encryption, holding a second hash function storage unit storing a predetermined second hash function pre-shared with the manager terminal, when receiving the first Internet blocking history information from the router equipment in response to the transmission request of the Internet blocking history information, generating a second encryption event for encrypting and transmitting the first Internet blocking history information to the manager terminal, when the second encryption event is generated, calculating operation data by performing an operation between the first dummy data and the second dummy data according to a predetermined first operation equation, and then encrypting the operation data with the encryption key to generate encryption operation data, applying the encryption operation data to the second hash function as the input to generate a second hash value, and then encrypting the first Internet blocking history information with the second hash value to generate first encryption Internet blocking history information, and encrypting the first dummy data with the encryption key to generate first encryption dummy data, and when the first encryption Internet blocking history information and the first encryption dummy data are generated, transmitting the first encryption Internet blocking history information and the first encryption dummy data to the manager terminal.

In this case, the manager terminal may pre-store the encryption key and the second hash function on the memory, display a scan indication message including contents indicating to scan the 2D code printed on the surface of the router equipment on a screen when the first encryption Internet blocking history information and the first encryption dummy data are received from Internet access management service server, and then encrypt the second dummy data with the encryption key to generate second encryption dummy data when the second dummy data is extracted from the 2D code as the 2D code printed on the surface of the router equipment is scanned and recognized through a camera mounted on the manager terminal by a manager, perform the operation between the first encryption dummy data and the second encryption dummy data according to a predetermined homomorphic operation equation corresponding to the first operation equation to calculate the homomorphic operation data, and then apply the homomorphic operation data to the second hash function as the input to generate the second hash value, and decode the first encryption Internet blocking history information with the second hash value to restore the first Internet blocking history information.

Further, according to an embodiment of the present invention, the operating method of an Internet access management service server may further include: after the scheduling rule setting request command is transmitted to the router equipment through the setting request command transmission unit?, receiving the access history information for the site accessed by the at least one management target terminal from the router equipment at an interval of a predetermined first period and verifies a URL address of a first site which the at least one management target terminal accesses the most during the first period based on the received access history information; when the URL address of the first site is verified, accessing a web page according to the URL address of the first site, and then crawling a text posted on the accessed web page; when the text posted on the web page is crawled, counting the number of times that a character string matching a plurality of predetermined harmful words appears in the crawled text, and then comparing the countered number of times and a predetermined reference number of times with each other; and when it is determined that the counted number of times exceeds the reference number of times, transmitting the URL address of the first site to the manager terminal and transmitting a warning message for notifying that the at least one management target terminal is accessing the URL address of a harmful site.

Hereinabove, the operating method for the Internet access management service server according to an embodiment of the present invention has been described with reference to FIG. 2. Here, since the operating method for the Internet access management service server according to an embodiment of the present invention may correspond to the configuration of the operation of the Internet access management service server 110 described by using FIG. 1, a more detailed description thereof will be omitted.

The operating method for the Internet access management service server capable of providing an Internet access management service based on terminal grouping according to an embodiment of the present invention may be implemented by a computer program stored in a storage medium for executing the computer program through coupling with a computer.

Further, the operating method of the Internet access management service server capable of providing an Internet access management service based on terminal grouping according to an embodiment of the present invention may be implemented in a program command type which may be performed through various computer means and recorded in a computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

The invention claimed is:

1. An Internet access management service server capable of providing an Internet access management service based on terminal grouping, comprising:
   a terminal unique identification information request unit requesting, when a transmission request command of terminal list information for performing Internet access management setting of predetermined router equipment is received from a manager terminal, transmission of terminal unique identification information for terminals currently connected to the router equipment;
   a terminal unique identification information transmission unit transmitting, when terminal unique identification information of a plurality of first terminals is received from the router equipment in response to the transmission request of the terminal unique identification information, the terminal unique identification information of the plurality of first terminals to the manager terminal;
   a profile information generation unit generating, when a generation request command of a profile for specifying a management group is received while the terminal unique identification information of at least one management target terminal selected among the plurality of first terminals is received from the manager terminal after the terminal unique identification information of the plurality of first terminals is transmitted to the manager terminal, first profile information constituted by the terminal unique identification information of at least one management target terminal;
   a scheduling rule setting request unit requesting, when the first profile information is generated, setting a scheduling rule for Internet access management to the manager terminal; and
   a setting request command transmission unit transmitting, when first schedule rule information, wherein the first schedule rule information is information constituted a uniform resource locator (URL) address of at least one site to be blocked for accessing and Internet access blocking time information, is received from the manager terminal, a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information to the router equipment.

2. The Internet access management service server of claim 1, wherein the setting request command transmission unit includes
   an equipment identification number storage unit storing an equipment identification number of t digits which is pre-issued for the router equipment, wherein an equipment identification number corresponding to the router equipment is pre-stored even in the router equipment and t is a natural number of 2 or more;
   a first hash function storage unit storing a predetermined first hash function pre-shared with the router equipment;
   a serial number table holding unit storing and holding a serial number table in which serial numbers of different t digits are recorded, which correspond to a plurality of predetermined time zones, respectively, which are pre-shared with the router equipment;
   a first encryption event generation unit generating, when receiving the first schedule rule information from the manager terminal, a first encryption event for encrypting and transmitting the first profile information and the first schedule rule information to the router equipment;
   a serial number extraction unit extracting, when the first encryption event is generated, a first serial number corresponding to a first time zone to which a time point when the first encryption event is generated belongs from the serial number table;

an operation code generation unit constituting, when the first serial number is extracted, a result value when performing a modulo-2 operation for each of t numbers constituting the equipment identification number corresponding to the router equipment by bitstreams to generate a first operation code of t bits and constituting a result value when performing the modulo-2 operation for each of t numbers constituting the first serial number by the bitstreams to generate a second operation code of t bits;

a first hash value generation unit performing an XOR operation between the first operation code and the second operation code to generate a t-bit seed code, and then applying the seed code to the first hash function as an input to generate a first hash value;

a first encryption unit generating, when the first hash value is generated, a first data set constituted by the first profile information and the first schedule rule information, and then encrypting the first data set with the first hash value to generate a first encryption data set; and a first transmissions processing unit transmitting, when the first encryption data set is generated, the first encryption data set to the router equipment, wherein the router equipment pre-stores the equipment identification number corresponding to the router equipment, the first hash function, and the serial number table on a memory, extracts the first serial number corresponding to the first time zone to which a time point of receiving the first encryption data set belongs from the serial number table when receiving the first encryption data set from the Internet access management service server, and then constitutes a result value when performing the modulo-2 operation for each of t numbers constituting the equipment identification number corresponding to the router equipment by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the first hash function as the input to generate the first hash value, and then decodes the first encryption data set with the first hash value to restore the first data set.

3. The Internet access management service server of claim 1, further comprising:

an Internet blocking history information request unit requesting, when receiving, from the manager terminal, a providing request command of Internet blocking history information for the at least one management target terminal according to the first schedule rule information during a predetermined first period after the scheduling rule setting request command is transmitted to the router equipment through the setting request command transmission unit, transmission of the Internet blocking history information for the at least one management target terminal according to the first schedule rule information during the first period to the router equipment; and an Internet blocking history information transmission unit transmitting, when receiving first Internet blocking history information, wherein the first Internet blocking history information is information constituted by the access blocking history information for the at least one site of the at least one management target terminal and the access blocking history information according to the Internet access blocking time, from the router equipment in response to the transmission request of the Internet blocking history information, the first Internet blocking history information to the manager terminal.

4. The Internet access management service server of claim 3, wherein the Internet blocking history information transmission unit includes a dummy data storage unit storing predetermined first dummy data and predetermined second dummy data, wherein the second dummy data is constituted by a 2D code including the second dummy data, and printed on the surface of the router equipment in advance, an encryption key storage unit storing a predetermined encryption key for homomorphic encryption, wherein the encryption key is pre-stored even in the manager terminal, a second hash function storage unit storing a predetermined second hash function pre-shared with the manager terminal, when receiving the first Internet blocking history information from the router equipment in response to the transmission request of the Internet blocking history information, a second encryption event generation unit generating a second encryption event for encrypting and transmitting the first Internet blocking history information to the manager terminal, when the second encryption event is generated, an encryption operation data generation unit calculating operation data by performing an operation between the first dummy data and the second dummy data according to a predetermined first operation equation, and then encrypting the operation data with the encryption key to generate encryption operation data, a second encryption unit applying the encryption operation data to the second hash function as the input to generate a second hash value, and then encrypting the first Internet blocking history information with the second hash value to generate first encryption Internet blocking history information, and encrypting the first dummy data with the encryption key to generate first encryption dummy data, and when the first encryption Internet blocking history information and the first encryption dummy data are generated, a second transmission processing unit transmitting the first encryption Internet blocking history information and the first encryption dummy data to the manager terminal, wherein the manager terminal pre-stores the encryption key and the second hash function on the memory, displays a scan indication message including contents indicating to scan the 2D code printed on the surface of the router equipment on a screen when the first encryption Internet blocking history information and the first encryption dummy data are received from Internet access management service server, and then encrypts the second dummy data with the encryption key to generate second encryption dummy data when the second dummy data is extracted from the 2D code as the 2D code printed on the surface of the router equipment is scanned and recognized through a camera mounted on the manager terminal by a manager, performs the operation between the first encryption dummy data and the second encryption dummy data according to a predetermined homomorphic operation equation corresponding to the first operation equation to calculate the homomorphic operation data, and then applies the homomorphic operation data to the second hash function as the input to generate the second hash value, and decodes the first encryption Internet blocking history information with the second hash value to restore the first Internet blocking history information.

5. The Internet access management service server of claim 1, further comprising:
after the scheduling rule setting request command is transmitted to the router equipment through the setting request command transmission unit, a URL address verification unit receiving the access history information for the site accessed by the at least one management target terminal from the router equipment at an interval of a predetermined first period and verifies a URL address of a first site which the at least one management target terminal accesses the most during the first period based on the received access history information;

when the URL address of the first site is verified, a crawling unit accessing a web page according to the URL address of the first site, and then crawling a text posted on the accessed web page;

when the text posted on the web page is crawled, a comparison unit counting the number of times that a character string matching a plurality of predetermined harmful words appears in the crawled text, and then comparing the countered number of times and a predetermined reference number of times with each other; and when it is determined that the counted number of times exceeds the reference number of times, a warning message transmission unit transmitting the URL address of the first site to the manager terminal and transmitting a warning message for notifying that the at least one management target terminal is accessing the URL address of a harmful site.

6. An operating method of an Internet access management service server capable of providing an Internet access management service based on terminal grouping, comprising:
requesting, when a transmission request command of terminal list information for performing Internet access management setting of predetermined router equipment is received from a manager terminal, transmission of terminal unique identification information for terminals currently connected to the router equipment;

when terminal unique identification information of a plurality of first terminals is received from the router equipment in response to the transmission request of the terminal unique identification information, transmitting the terminal unique identification information of the plurality of first terminals to the manager terminal;

when a generation request command of a profile for specifying a management group is received while the terminal unique identification information of at least one management target terminal selected among the plurality of first terminals is received from the manager terminal after the terminal unique identification information of the plurality of first terminals is transmitted to the manager terminal, generating first profile information constituted by the terminal unique identification information of at least one management target terminal;

requesting, when the first profile information is generated, setting a scheduling rule for Internet access management to the manager terminal; and transmitting, when first schedule rule information, wherein the first schedule rule information is information constituting a uniform resource locator (URL) address of at least one site to be blocked for accessing and Internet access blocking time information, is received from the manager terminal, a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information to the router equipment.

7. The operating method of an Internet access management service server of claim 6, wherein the transmitting of the scheduling rule setting request command includes
holding an equipment identification number storage unit storing an equipment identification number of t digits which is pre-issued for the router equipment, wherein an equipment identification number corresponding to the router equipment is pre-stored even in the router equipment and t is a natural number of 2 or more, holding a first hash function storage unit storing a predetermined first hash function pre-shared with the router equipment, storing and holding a serial number table in which serial numbers of different t digits are recorded, which correspond to a plurality of predetermined time zones, respectively, which are pre-shared with the router equipment, generating, when receiving the first schedule rule information from the manager terminal, a first encryption event for encrypting and transmitting the first profile information and the first schedule rule information to the router equipment, extracting, when the first encryption event is generated, a first serial number corresponding to a first time zone to which a time point when the first encryption event is generated belongs from the serial number table, constituting, when the first serial number is extracted, a result value when performing a modulo-2 operation for each of t numbers constituting the equipment identification number corresponding to the router equipment by bitstreams to generate a first operation code of t bits and constituting a result value when performing the modulo-2 operation for each of t numbers constituting the first serial number by the bitstreams to generate a second operation code of t bits, performing an XOR operation between the first operation code and the second operation code to generate a t-bit seed code, and then applying the seed code to the first hash function as an input to generate a first hash value, generating, when the first hash value is generated, a first data set constituted by the first profile information and the first schedule rule information, and then encrypting the first data set with the first hash value to generate a first encryption data set, and transmitting, when the first encryption data set is generated, the first encryption data set to the router equipment, wherein the router equipment pre-stores the equipment identification number corresponding to the router equipment, the first hash function, and the serial number table on a memory, extracts the first serial number corresponding to the first time zone to which a time point of receiving the first encryption data set belongs from the serial number table when receiving the first encryption data set from the Internet access management service server, and then constitutes a result value when performing the modulo-2 operation for each of t numbers constituting the equipment identification number corresponding to the router equipment by the bitstreams to generate the first operation code of t bits and constitutes a result value when performing the modulo-2 operation for each of t numbers constituting the first serial number by the bitstreams to generate the second operation code of t bits, and then performs the XOR operation between the first operation code and the second operation code to generate the seed code of t bits, applies the seed code to the first hash function as the input to generate the first hash value, and then decodes the first encryption data set with the first hash value to restore the first data set.

8. The operating method of an Internet access management service server of claim 6, further comprising:
when receiving, from the manager terminal, a providing request command of Internet blocking history information for the at least one management target terminal according to the first schedule rule information during a predetermined first period after the scheduling rule setting request command is transmitted to the router equipment, requesting transmission of the Internet blocking history information for the at least one management target terminal according to the first schedule rule information during the first period to the router equipment; and
when receiving first Internet blocking history information, wherein the first Internet blocking history information is information constituted by the access blocking history information for the at least one site of the at least one management target terminal and the access blocking history information according to the Internet access blocking time, from the router equipment in response to the transmission request of the Internet blocking history information, transmitting the first Internet blocking history information to the manager terminal.

9. The operating method of an Internet access management service server of claim 8, wherein the transmitting of the first Internet blocking history information includes
holding a dummy data storage unit storing predetermined first dummy data and predetermined second dummy data, wherein the second dummy data is constituted by a 2D code including the second dummy data, and printed on the surface of the router equipment in advance,
holding an encryption key storage unit storing a predetermined encryption key, wherein the encryption key is pre-stored even in the manager terminal, for homomorphic encryption,
holding a second hash function storage unit storing a predetermined second hash function pre-shared with the manager terminal,
when receiving the first Internet blocking history information from the router equipment in response to the transmission request of the Internet blocking history information, generating a second encryption event for encrypting and transmitting the first Internet blocking history information to the manager terminal,
when the second encryption event is generated, calculating operation data by performing an operation between the first dummy data and the second dummy data according to a predetermined first operation equation, and then encrypting the operation data with the encryption key to generate encryption operation data,
applying the encryption operation data to the second hash function as the input to generate a second hash value, and then encrypting the first Internet blocking history information with the second hash value to generate first encryption Internet blocking history information, and encrypting the first dummy data with the encryption key to generate first encryption dummy data, and
when the first encryption Internet blocking history information and the first encryption dummy data are generated, transmitting the first encryption Internet blocking history information and the first encryption dummy data to the manager terminal,
wherein the manager terminal pre-stores the encryption key and the second hash function on the memory, displays a scan indication message including contents indicating to scan the 2D code printed on the surface of the router equipment on a screen when the first encryption Internet blocking history information and the first encryption dummy data are received from Internet access management service server, and then encrypts the second dummy data with the encryption key to generate second encryption dummy data when the second dummy data is extracted from the 2D code as the 2D code printed on the surface of the router equipment is scanned and recognized through a camera mounted on the manager terminal by a manager, performs the operation between the first encryption dummy data and the second encryption dummy data according to a predetermined homomorphic operation equation corresponding to the first operation equation to calculate the homomorphic operation data, and then applies the homomorphic operation data to the second hash function as the input to generate the second hash value, and decodes the first encryption Internet blocking history information with the second hash value to restore the first Internet blocking history information.

10. The operating method of an Internet access management service server of claim 6, further comprising:
after the scheduling rule setting request command is transmitted to the router equipment through the setting request command transmission unit?, receiving the access history information for the site accessed by the at least one management target terminal from the router equipment at an interval of a predetermined first period and verifies a URL address of a first site which the at least one management target terminal accesses the most during the first period based on the received access history information;
when the URL address of the first site is verified, accessing a web page according to the URL address of the first site, and then crawling a text posted on the accessed web page;
when the text posted on the web page is crawled, counting the number of times that a character string matching a plurality of predetermined harmful words appears in the crawled text, and then comparing the countered number of times and a predetermined reference number of times with each other; and
when it is determined that the counted number of times exceeds the reference number of times, transmitting the URL address of the first site to the manager terminal and transmitting a warning message for notifying that the at least one management target terminal is accessing the URL address of a harmful site.

11. A non-transitory computer readable recording medium having a program recorded therein for allowing a computer to execute an operating method of an Internet access management service server capable of providing an Internet access management service based on terminal grouping, comprising:

requesting, when a transmission request command of terminal list information for performing Internet access management setting of predetermined router equipment is received from a manager terminal, transmission of terminal unique identification information for terminals currently connected to the router equipment;

when terminal unique identification information of a plurality of first terminals is received from the router equipment in response to the transmission request of the terminal unique identification information, transmitting the terminal unique identification information of the plurality of first terminals to the manager terminal;

when a generation request command of a profile for specifying a management group is received while the terminal unique identification information of at least one management target terminal selected among the plurality of first terminals is received from the manager terminal after the terminal unique identification information of the plurality of first terminals is transmitted to the manager terminal, generating first profile information constituted by the terminal unique identification information of at least one management target terminal;

requesting, when the first profile information is generated, setting a scheduling rule for Internet access management to the manager terminal; and transmitting, when first schedule rule information, wherein the first schedule rule information is information constituting a uniform resource locator (URL) address of at least one site to be blocked for accessing and Internet access blocking time information, is received from the manager terminal, a scheduling rule setting request command of requesting setting a scheduling rule for preventing the at least one management target terminal included in the first profile information from accessing the URL address of the at least one site and accessing the Internet during an Internet access blocking time, according to the first schedule rule information while transmitting the first profile information and the first schedule rule information to the router equipment.

* * * * *